United States Patent
Nitta et al.

(10) Patent No.: US 7,081,921 B2
(45) Date of Patent: Jul. 25, 2006

(54) METHOD AND APPARATUS FOR PROCESSING FRONT END SIGNAL FOR IMAGE SENSOR

(76) Inventors: Shozo Nitta, 2 - 40 -1 Kaminakazato Kita-Ku, Tokyo (JP) 114-0016; Kenji Tanaka, 7435 Kitashinagawa 6 - chome, Shinagawa-ku, Tokyo (JP); Tatsuo Isumi, 307 Excel - Sagamihara 1- 8 - 3 Chao, Sagamihara, Kanagawa (JP); Akira Morikawa, 5 - 15 -16 -701 Higashi - Kasai, Edogawa-Ku, Tokyo (JP) 134-0084; Kyoji Matsusako, 201 Mingmimachida Garden, 64-6-1 Tsuruma, Machida City, Tokyo (JP); Sean Chuang, 10156 E. Sonoran Heights Pl., Tucson, AZ (US) 85748; Mike Koen, 4939 N. Bonits Ridge Ave., Tucson, AZ (US) 85750

( * ) Notice: Subject to any disclaimer, the term of this patent is extended or adjusted under 35 U.S.C. 154(b) by 780 days.

(21) Appl. No.: 09/741,218

(22) Filed: Dec. 20, 2000

(65) Prior Publication Data
US 2002/0047934 A1 Apr. 25, 2002

(30) Foreign Application Priority Data
Dec. 28, 1999 (JP) .................................. 11/372378

(51) Int. Cl.
*H04N 5/235* (2006.01)
(52) U.S. Cl. .............................. 348/229.1; 348/228.1; 348/234; 348/241
(58) Field of Classification Search ................ 348/379, 348/678, 687, 222.1, 227.1, 230.1, 234, 689, 348/243, 228.1, 229.1, 241, 254, 255, 257, 348/258
See application file for complete search history.

(56) References Cited

U.S. PATENT DOCUMENTS

| | | | |
|---|---|---|---|
| 6,499,663 B1 * | 12/2002 | Yahagi et al. | 235/462.28 |
| 6,650,364 B1 * | 11/2003 | Itani et al. | 348/229.1 |

(Continued)

OTHER PUBLICATIONS

U.S. Appl. No. 09/075,382, Johnson et al., May 8, 1998.*

(Continued)

*Primary Examiner*—Tuan Ho

*Assistant Examiner*—Nelson D Hernandez

(74) *Attorney, Agent, or Firm*—Frederick J. Telecky, Jr.

(57) ABSTRACT

A front end signal processing method and apparatus for processing a signal from an image sensor are provided for readily clamping a black level, improving the manufacturing yield, and reducing the power consumption. A luminance detector/digitizer receives a sensor output signal from an image sensor, detects luminance information included in the sensor output signal, and generates a digital luminance signal representative of the detected luminance information. A digital processor receives the digital luminance signal, and multiplies the digital luminance signal by a predetermined gain code to generate the multiplication result as a front end processed signal output. An optical black clamp receives the digital luminance signal from the luminance signal detector/digitizer and supplies a feedback signal produced from the digital luminance signal to the luminance signal detector/digitizer to clamp a black level of the luminance signal to a constant value.

16 Claims, 6 Drawing Sheets

U.S. PATENT DOCUMENTS

| | | | | |
|---|---|---|---|---|
| 6,707,492 | B1* | 3/2004 | Itani | 348/229.1 |
| 6,720,999 | B1* | 4/2004 | Holberg et al. | 348/222.1 |
| 6,783,073 | B1* | 8/2004 | Yahagi et al. | 235/462.28 |
| 6,791,607 | B1* | 9/2004 | Bilhan et al. | 348/243 |
| 2002/0033891 | A1* | 3/2002 | Ying et al. | 348/241 |
| 2002/0176009 | A1* | 11/2002 | Johnson et al. | 348/229 |
| 2002/0179712 | A1* | 12/2002 | Yahagi et al. | 235/454 |

OTHER PUBLICATIONS

Kouichi Yahagi, WO 99/23819, May 14, 1999, "Image Input System".*

"A CMOS Front-End for CCD Cameras" by Mangelsdorf et al., 1996 IEEE International Solid-State Circuits Conference, pp. 186-187.

* cited by examiner

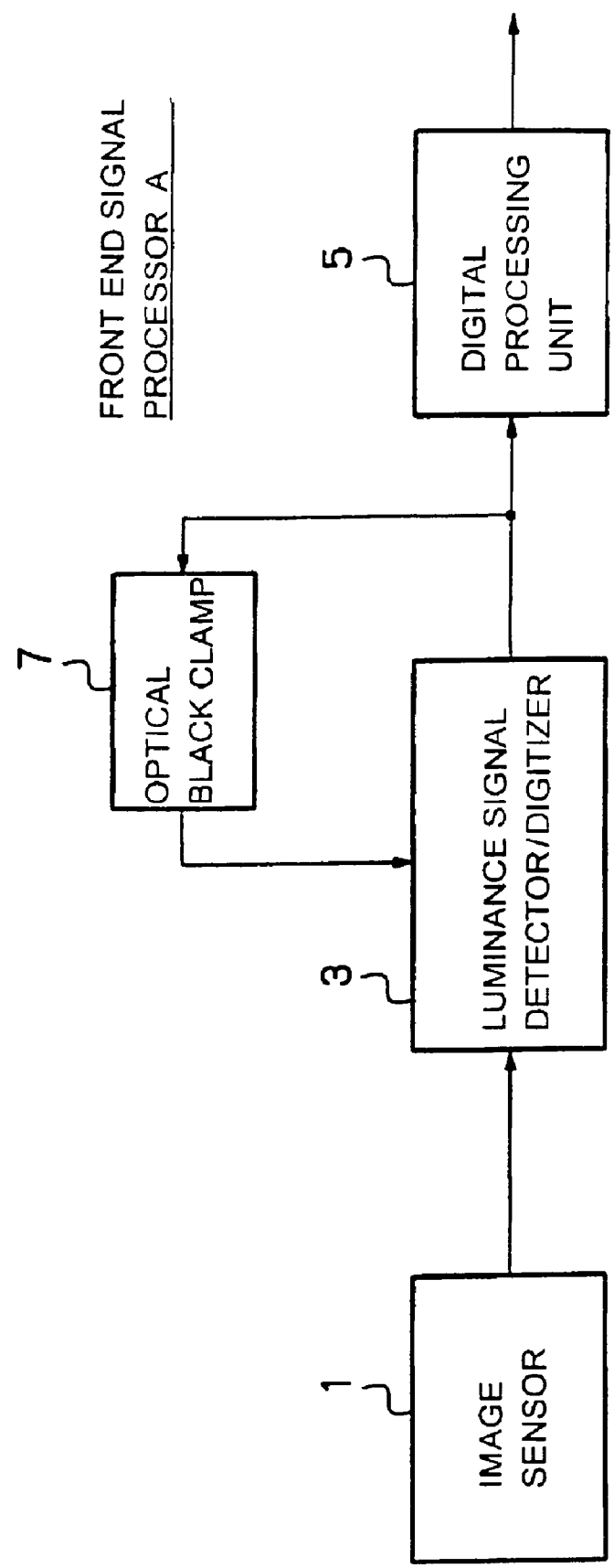

_MethOD AND APPARATUS FOR PROCESSING FRONT END SIGNAL FOR IMAGE SENSOR_

METHOD AND APPARATUS FOR PROCESSING FRONT END SIGNAL FOR IMAGE SENSOR

BACKGROUND OF THE INVENTION

The present invention relates to a front end signal processing method and apparatus for processing signals from a variety of image sensors such as a CCD (Charge Coupled Device) image sensor.

Conventionally, a front end signal processor having a circuit configuration as illustrated in FIG. 6 has been up used for processing signals from an image sensor such as a CCD image sensor. Specifically, as illustrated, the conventional front end signal processor comprises a correlated double sampler CDS coupled to receive an input (CCD Input) from a CCD image sensor; an analog programmable gain amplifier PGA; and an analog-to-digital (A/D) converter ADC. As can be seen, the analog programmable gain amplifier PGA is located between the correlated double sampler CDS and the A/D converter ADC so as to amplify sampled signals in an analog form and input the amplified signals to the A/D converter ADC. Some analog programmable gain amplifiers may include a logarithmic amplifier (or a logarithmic attenuator) which has a gain characteristic exhibiting a linear gain curve for a gain control signal, when represented in dB, for amplifying (or attenuating) signals from a correlated double sampler. The gain curve is typically plotted in logarithmic scale because of the characteristic of human's visual sense to the brightness. In this event, the programmable gain amplifier contains a special amplifier or attenuator for imposing the logarithmic characteristic on the gain characteristic with respect to a control signal (PGACONT). Also, the conventional front end signal processor comprises a feedback loop including an optical black (OB) clamp circuit OBCLAMP and a capacitor CAP for storing a black level in order to clamp the black level of a luminance signal from an image sensor. As illustrated, since the feedback loop is formed such that the input or output of the A/D converter (the input is only shown in FIG. 6) is fed back to the correlated double sampler CDS or the programmable gain amplifier PGA (indicated by a solid line and a dotted line, respectively), a gain stage such as the programmable gain amplifier PGA is often contained in the feedback loop.

The conventional front end signal processor configured as described above encounters difficulties in improving the performance of the logarithmic amplifier (or logarithmic attenuator) arranged in the analog programmable gain amplifier and hence difficulties in providing a linear gain curve, represented in dB, which is required for the logarithmic amplifier. Also, the gain curve presented by the logarithmic amplifier highly depends on variations in devices introduced in course of the manufacturing, and may sometimes experience a larger deviation from a straight line. This is the main cause of reducing the yield of the entire front end signal processor. Further, the programmable gain amplifier block consumes significant power in order to ensure the linearity and sufficient noise performance for the logarithmic amplifier.

Furthermore, since the conventional signal processor described above contains the analog programmable gain amplifier which includes an amplifier such as a logarithmic amplifier within the optical black clamp feedback loop, a convergence time constant of the loop largely varies depending on the gain of the amplifier. A correction to the variations in the gain involves complicated analog processing such as insertion of an amplifier having a gain reverse to the gain of the amplifier within the programmable gain amplifier into the feedback loop to fix the time constant.

For the reason set forth above, conventional front end signal processors generally require high power consumption in a range of 150 to 200 mW, and very few require power consumption lower than 100 mW.

SUMMARY OF THE INVENTION

It is therefore an object of the present invention to provide a front end signal processing method and apparatus which require low power consumption.

It is another object of the present invention to provide a front end signal processing method and apparatus which are capable of improving the linearity of the gain curve for amplifying the output of a sensor.

It is a further object of the present invention to provide a front end signal processing method and apparatus which are capable of improving black level clamping.

It is a further object of the present invention to provide a front end signal processing method and apparatus which are capable of increasing the manufacturing yield.

To realize the above objects, the present invention is generally characterized by digitally amplifying a signal from an image sensor, performing the signal amplification after analog-to-digital conversion, and using the signal before the signal amplification for clamping the optical black.

Specifically, according to a first aspect of the present invention, a front end signal processing method for processing a signal from an image sensor comprising the steps of detecting luminance information included in a sensor output signal from the image sensor to generate a digital luminance signal representative of the detected luminance information, clamping a black level of the luminance signal to a constant value based on the digital luminance signal, and digitally multiplying the digital luminance signal by a predetermined gain code to generate a front end processed signal output.

According to the present invention, the step of detecting luminance information and generating a digital luminance signal may include the steps of receiving the image sensor output, detecting the luminance information included in the sensor output signal, and generating an analog luminance signal representative of the detected luminance information, and converting the analog luminance signal to a digital form to generate a digitized output. Also, the step of detecting luminance information and generating a digital luminance signal may generate the digitized output with a higher resolution than the front end processed signal output. Further, the step of detecting luminance information and generating a digital luminance signal may further include the steps of generating a reference black level value for the image sensor, and subtracting the reference black level value from the digitized output to generate the subtraction result as the digital luminance signal. The reference black level value may be variable.

Further, according to the present invention, the step of digitally multiplying may include using a digital programmable gain amplifier. In this event, the step of digitally multiplying may include the steps of generating the predetermined gain code, digitally multiplying the digital luminance signal by the gain code to generate an amplified digital luminance signal, generating a pedestal code representative of a pedestal level, and adding the pedestal code to the amplified digital luminance signal to generate the addition result as the front end processed signal output. The pedestal code may be variable.

According to a second aspect of the present invention, a front end signal processing apparatus for processing a signal from an image sensor comprises a luminance detecting/digitizing circuit coupled to receive a sensor output signal from the image sensor for detecting luminance information included in the sensor output signal to generate a digital luminance signal representative of the luminance information, digital processing circuit coupled to receive the digital luminance signal for multiplying the digital luminance signal by a predetermined gain code to generate the multiplication result as a front end processed signal output, and a clamping circuit coupled to receive the digital luminance signal for supplying a feedback signal produced from the digital luminance signal to the luminance detecting/digitizing circuit to clamp a black level of the luminance signal to a constant value.

According to the present invention, the luminance detecting/digitizing circuit may include a correlated double sampler coupled to receive the image sensor output for detecting luminance information included in the sensor output signal to generate an analog luminance signal representative of the detected luminance information, and an A/D converter coupled to receive the analog luminance signal to convert the analog luminance signal to a digital form to generate a digitized output. The A/D converter may generate the digitized output with a higher resolution than the front end processed signal output. In this event, the A/D converter may be configured such that a linearity is increased as an input to the A/D converter is reduced, and may be implemented, for example, by a pipeline A/D converter. The luminance detecting/digitizing circuit may further include a reference black level value generating circuit for generating a reference black level value for the image sensor, and a subtractor connected to an output of the A/D converter and to the black level value generating circuit for subtracting the reference black level value from the digitized output to generate the subtraction result as the digital luminance signal of the luminance detecting/digitizing circuit. The reference black level value generating circuit may generate a variable reference black level value. The digital processing circuit may include a digital programmable gain amplifier. In this event, the digital processing circuit includes a gain code generating circuit for generating the predetermined gain code, a multiplying circuit for digitally multiplying the digital luminance signal by the gain code to generate an amplified digital luminance signal, a pedestal code generating circuit for generating a pedestal code representative of a pedestal level, and an adder for adding the pedestal code to the amplified digital luminance signal to generate the addition result as the front end processed signal output. The pedestal code generating circuit may generate a variable pedestal code.

According to the present invention, the clamping circuit may supply the feedback signal to a reference voltage terminal of the correlated double sampler or to a reference voltage terminal of the A/D converter.

BRIEF DESCRIPTION OF THE DRAWINGS

FIG. 1 is a block diagram illustrating a front end signal processor according to one embodiment of the present invention;

DETAILED DESCRIPTION OF THE INVENTION

The present invention will hereinafter be described in conjunction with the preferred embodiments thereof in detail with reference to the accompanying drawings.

FIG. 1 is a block diagram illustrating the basic configuration of a front end signal processor A according to a first embodiment of the present invention. The illustrated front end processor A comprises an image sensor 1; a luminance signal detector/digitizer 3; a digital processing unit 5; and an optical black clamp 7. It should be noted that while the image sensor 1 is implemented by a CCD image sensor in this embodiment, any arbitrary image sensor may be used instead, including a CMOS image sensor, a line sensor, and so on.

Figure 2A:
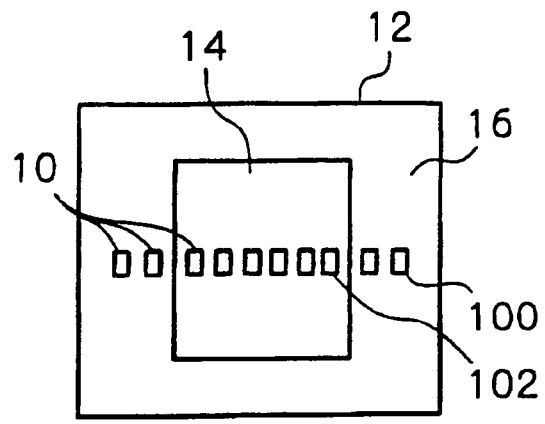
FIG. 2A is a schematic diagram illustrating the configuration of a CCD sensor 1.
Figure 2B:
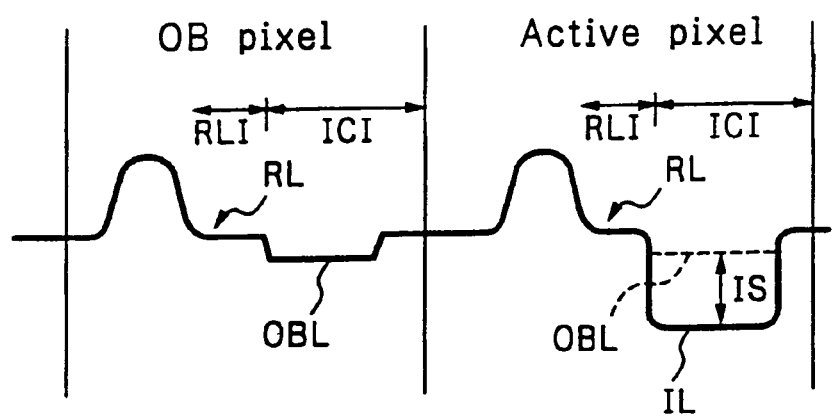
FIG. 2B illustrates the waveforms of output signals from pixels which form part of the CCD sensor 1.

FIG. 2A illustrates the configuration of the CCD sensor 1, and FIG. 2B illustrates the waveforms of output signals from pixels of the sensor 1. As illustrated, the sensor 1 has a rectangular area 12 comprised of a large number of pixels 10 arranged in a matrix form (only a portion of which is illustrated). The rectangular area 12 includes a rectangular active area 14 at the center smaller than the area 12, and an optical black (OB) area 16 surrounding the active area 14. The rectangular area 12 is configured such that light is incident on the active area 14 but is completely blocked by the OB area 16. FIG. 2B illustrates the waveform of an output signal from a single OB pixel 100 within the OB area 16; and the waveform of an output signal from a single active pixel 102 within the active area 14. The output waveform from each pixel has the same period, as well as a reference interval RL1 for defining a reference level RL and an interval ICI for defining a luminance component. The luminance component interval ICI has a black level section OBL normally having a level slightly lower than the reference level RL for the OB pixel 100, and a luminance component level IL equal to or lower than the black level for the active pixel 102. The luminance component level IL is such that the difference between the luminance component level itself and the black level OBL detected at the OB pixel 100 represents the luminance. Thus, for detecting a luminance level including the black level OBL, it is necessary to perform double sampling, i.e., once in the reference interval RL1 and once in the luminance component interval ICI to detect the difference therebetween. Detection of a luminance signal IS, on the other hand, involves detecting the difference between the luminance component level IL and the black level OBL. It should be noted that the black level OBL largely varies from one CCD sensor to another, which may be used as the image sensors 1.

Figure 2C:
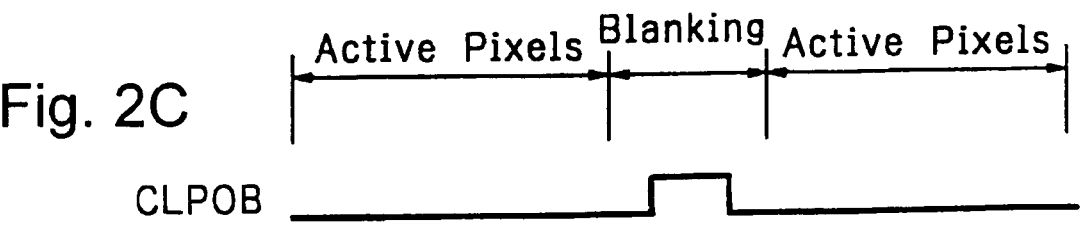
FIG. 2C illustrates a clamp timing signal CLPOB.

FIG. 2C illustrates a clamp timing signal CLPOB for detecting a black level OBL output from an OB pixel 100 in the OB area 16. As illustrated, the clamp timing signal CLPOB is at low during an active pixel 102 in the active area 14, and transitions to high (active) during a blanking period corresponding to the OB area 16.

The luminance signal detector/digitizer 3 having an input connected to the output of the CCD sensor 1 detects the luminance signal IS included in a received image sensor output signal as described above, and generates a digital luminance signal representative of the detected luminance signal IS at its output. The subsequent digital processing unit 5 has an input connected to the output of the luminance signal detector/digitizer 3, and performs digital multiplication processing on a received digital luminance signal, thereby generating at its output a front end processed signal output. The OB clamp 7 also has an input connected to the output of the luminance signal detector/digitizer 3 for receiving the digital luminance signal therefrom. Then, the OB clamp 7 has an output connected to the luminance signal detector/digitizer 3 for compensating for variations or fluctuations in the black level OBL of the luminance signal detected from the image sensor 1. The OB clamp 7 conducts the feedback control for compensating for the variations in the black level OBL such that the value of the digital luminance signal remains at a fixed value, i.e., a reference black level value (also referred to as the "OB clamp level") during a period in which the image sensor 1 is generating outputs from OB pixels such as the OB pixel 100, and stores the value. Otherwise, during a period in which the image sensor 1 is generating outputs from active pixels such as the active pixel 102, the OB clamp 7 keeps supplying the stored value.

Figure 3:
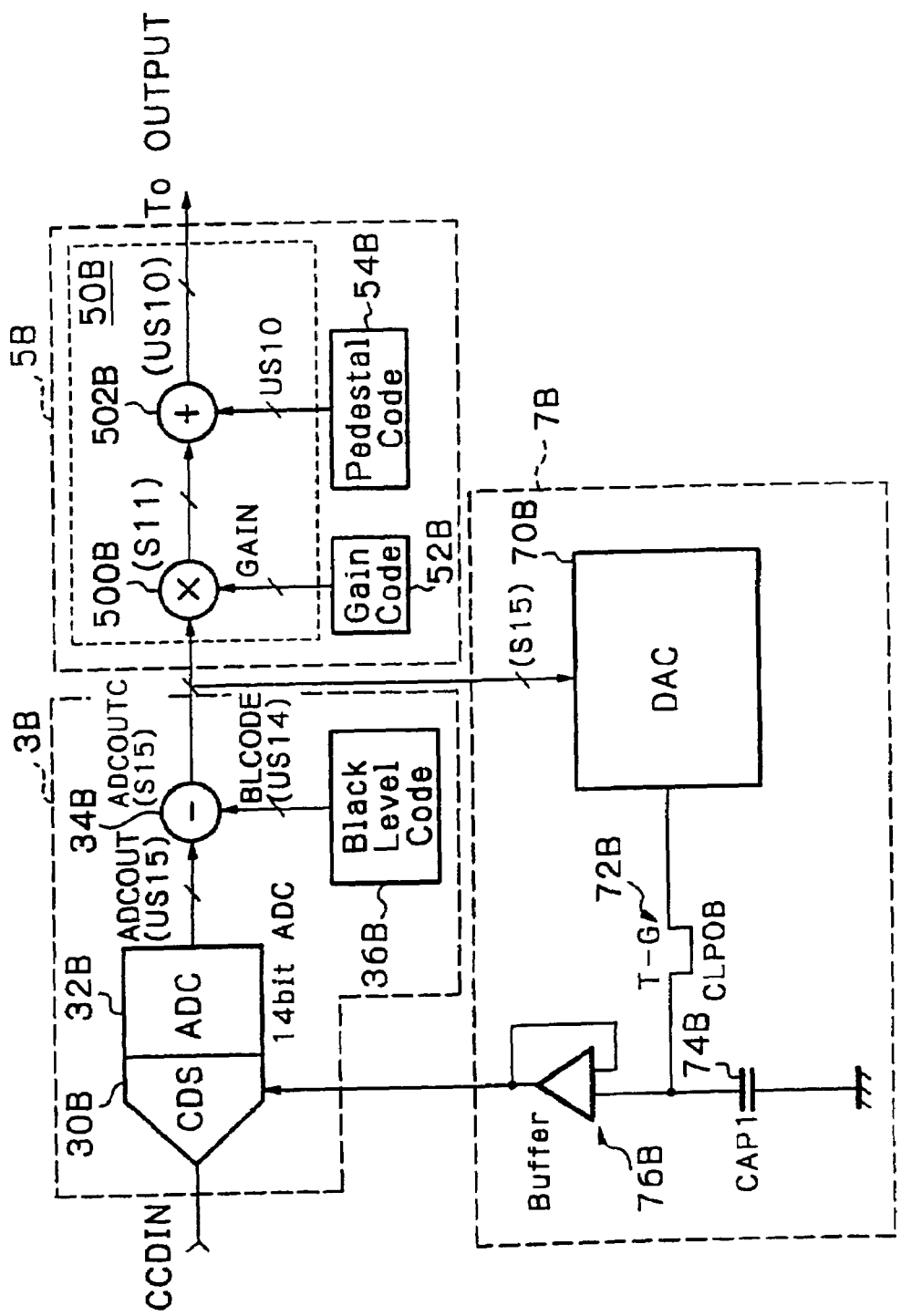
FIG. 3 is a block diagram of a front end signal processor according to another embodiment of the present invention, illustrating a more specific version of the configuration illustrated in FIG. 1.

FIG. 3 illustrates in block diagram form a front end signal processor B which is a more specific version of the configuration illustrated in FIG. 1. The illustrated front end signal processor B comprises a luminance signal detector/digitizer 3B; a digital processor 5B; and an optical black (OB) clamp 7B, corresponding to the respective components 3, 5, 7 in FIG. 1. The luminance signal detector/digitizer 3B includes a correlated double sampler (CDS) 30B having an input terminal CCDIN for receiving an output signal from a CCD sensor 1, and an input for receiving a feedback signal from the OB clamp 7B; an analog-to-digital (A/D) converter 32B having an input connected to the output of the correlated double sampler 30B; and a subtractor 34B having an input connected to the output of the A/D converter 32B. The correlated double sampler 30B performs the double sampling as previously discussed with reference to FIG. 2 to detect luminance information, and outputs an analog luminance signal. The A/D converter 32B, which receives the analog luminance signal, is a 14-bit A/D converter that converts the received analog luminance signal to a digital luminance signal ADCOUT, and outputs the resulting digital luminance signal ADCOUT. The output of the A/D converter 32B is an unsigned 14-bit signal (US14). The subtractor 34B receives the digital luminance signal ADCOUT at one input and a 14-bit reference black level code BLCODE at the other input. The reference black level code is delivered by an illustrated black level code generator 36B for use in compensation for variations in black level from the CCD sensor 1. The subtractor 34B subtracts the black level code BLCODE from the digital signal ADCOUT to generate a digital luminance signal ADCOUTC, which has variations in black level compensated, in the form of a signed 15-bit (S15) signal. The compensation results in the digital luminance signal ADCOUTC equal to zero value when "full black" is input from the CCD sensor 1.

The digital processing unit SB includes a digital programmable gain amplifier 50B; a gain code generator 52B; and a pedestal code generator 54B. The digital programmable gain amplifier 50B in turn includes a multiplier 500B which performs digital multiplication; and an adder 502B. More specifically, the multiplier 500B receives the digital luminance signal ADCOUTC, which is the output from the luminance signal detector/digitizer 3B, at one input, and a gain code from the gain code generator 52B at the other input. A gain GAIN represented by the gain code has a value which varies in a logarithmic fashion depending on the magnitude of an input (not shown) received by the gain code generator 52B for conducting the logarithmic amplification as before. The logarithmic gain may be digitally implemented, for example, by use of a dedicated linear-LOG conversion table. The multiplier 500B, thus configured, multiplies the digital luminance signal ADCOUTC by the gain GAIN, and outputs the resultant product in the form of an 11-bit signal. The subsequent adder 502B receives the output from the multiplier 500B at one input and a 10-bit pedestal code PCODE at the other input. The pedestal code PCODE is generated by the pedestal code generator 54B for offsetting the multiplied digital luminance signal toward the positive (plus) side. The adder 502B adds both inputs to generate the result as a 10-bit front end processed signal output OUT. The output is represented by the following equation:

OUT=GAIN (ADCOUT−BLCODE)+PCODE

As can be seen from the equation above, ADCOUT is equal to BLCODE when full black is input from the CCD sensor 1, so that the output OUT is coincident with the pedestal code PCODE. Then, as light is incident on the CCD sensor 1, the output OUT presents a larger code than that for the full black. In this way, since the gain code generator 52B digitally generates the gain GAIN, a desired arbitrary gain characteristic, such as a logarithmic curve, can be readily implemented as compared with a conventional analog logarithmic amplifier which has been used for the same purpose. In addition, since the gain is produced in digital form, it is possible to fully predict any deviation from an ideal gain characteristic. The digital-based gain code generator 52B is also advantageous in eliminating deviations of a gain curve due to variations in devices introduced in course of the manufacturing, and significantly improving the yield.

Turning next to description on the OB clamp 7B, the OB clamp 7B includes a digital-to-analog (D/A) converter 70B; a transmission gate (T-G) 72B; a capacitor (CAP1) 74B; and a buffer 76B. The D/A converter 70B receives the digital luminance signal ADCOUTC, which is the output of the subtractor 34B, at an input, and generates an analog version of the received digital luminance signal at an output. The gate 72B, which receives the analog output at one terminal, has a control input for receiving a timing signal CLPOB previously illustrated in FIG. 2C, such that the analog output from the D/A converter 70B is passed to another terminal only when the timing signal CLPOB is at high. The other terminal of the gate 72B is connected to a ground through the capacitor 74B, so that the analog output from the gate 72B is integrated to store a feedback voltage for black level compensation on the capacitor 74B. The gate 723 acts as a switch for opening and closing the circuit to the capacitor 74B. The capacitor 74B has an upper terminal connected to a reference voltage terminal of the correlated double sampler 30B through the buffer 76B, thereby supplying the feedback voltage to the reference voltage terminal. Then, the correlated double sampler 3OB offsets the generated analog luminance signal such that the black level OBL of the analog luminance signal is set to a zero level in the digital luminance signal ADCOUTC. In this way, a negative feedback control is implemented. More specifically, the offset provided by the correlated double sampler 30B is adjusted to decrease the signal ADCOUT when the difference between the signal ADCOUT and the black level code BLCODE is positive, and to increase the signal ADCOUT when the difference between the signal ADCOUT and the black level code BLCODE is negative.

Next, the operation of the OB clamp 7B will be described. A clamp loop including the OB clamp 7B is closed in a period in which a full black signal is being received from an OB pixel (actually during a "high" period of the timing signal CLPOB) to accumulate a feedback voltage on the capacitor 74B for maintaining the digital luminance signal ADCOUTC constant during this period, thereby preparing a voltage for the black level compensation. In the remaining period, in which the timing signal CLPOB is at low, the feedback voltage accumulated on the capacitor 74B is supplied to the correlated double sampler 30B to compensate for the black level. Since this feedback loop does not include a variable gain stage as does the prior art, the time constant is substantially constant. This eliminates complicated analog processing, as has been required in the prior art, for stabilizing the time constant when the gain is changed.

Figure 4:
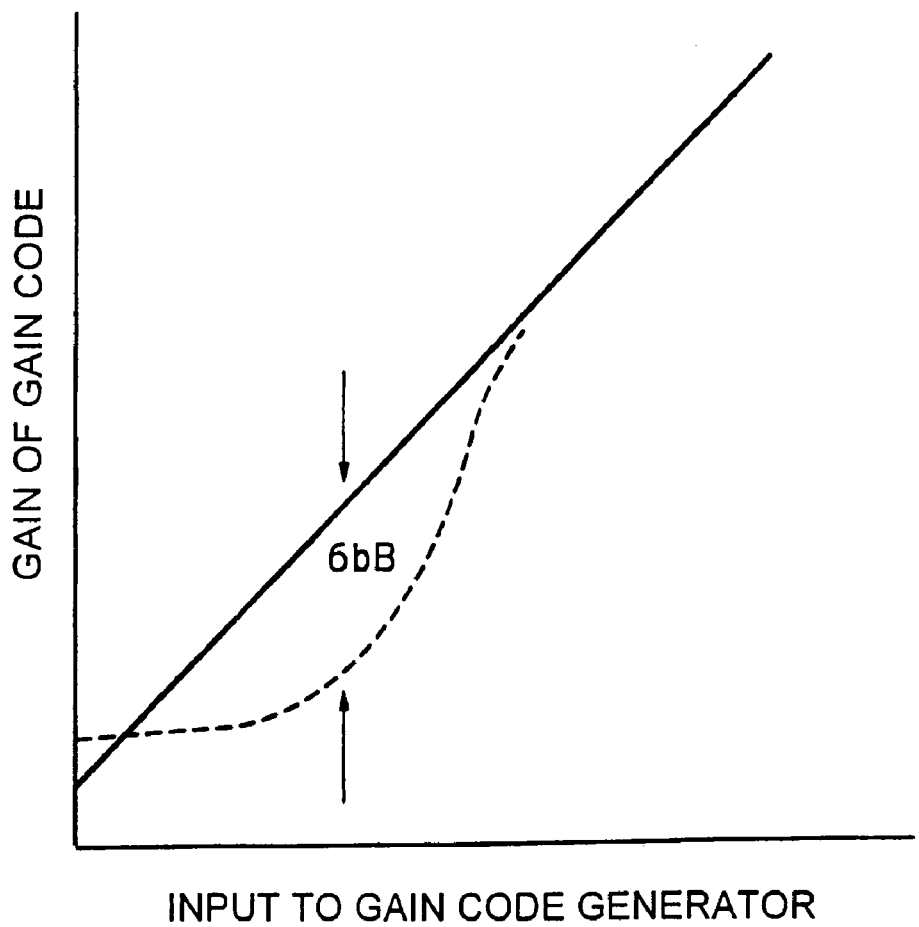
FIG. 4 is a graph illustrating a logarithmic amplification characteristic realized by a multiplier in a digital programmable gain amplifier shown in FIG. 3.

Next, the operation of the gain code generator 52B for generating the logarithmic gain GAIN will be described with reference to FIG. 4. In FIG. 4, the horizontal axis represents the input to the gain code generator 52B, and the vertical axis represents the gain GAIN in logarithmic scale which is the output of the gain code generator 52B. As illustrated, this embodiment provides substantially a linear gain characteristic (as indicated by a solid line), whereas a conventional logarithmic amplifier fails to provide a linear characteristic (as indicated by a dotted line) which exhibits a deviation from the straight line that is as large as 6 dB at maximum. The front end signal processor according to the present invention can readily create a logarithmic gain characteristic. Also, since the digitally created gain permits any deviation from an ideal gain characteristic to be perfectly predicted, the front end signal processor of the present invention eliminates a deviated gain curve due to variations in devices introduced in course of the manufacturing, and significantly improves the yield. Further advantageously, the ability of digitally creating the gain enables other arbitrary characteristics to be readily produced, not limited to the logarithmic characteristic.

Explanation will be next given of why the resolution of the A/D converter 32B is chosen to be higher than the resolution of the entire front end signal processor. In the foregoing embodiment, the A/D converter 32B has the resolution of 14 bits which is higher by four bits than the front end signal processing output which has the resolution of ten bits. This is because the A/D converter 32B must have an extra margin for a maximum resolution which could be lost by the digital multiplication performed in the digital programmable gain amplifier 50B. More specifically, in the digital multiplication, when a signal is digitally multiplied by two (i.e., a data code is shifted to the left by one bit), the right-most one bit of information is lost so that the resolution is reduced by one bit. It is therefore necessary to previously provide the A/D converter 32B with a surplus resolution for a portion which could be lost during the digital multiplication in order to maintain a constant resolution as the entire signal processor even when the gain is made higher. For example, assuming that a maximum gain is 64 ($=2^6$) times and the resolution required for the signal processor is eight bits when the maximum gain is used, the A/D converter 32B needs 14 bits of resolution (8+6=14). For this reason, the A/D converter 32B is given a resolution higher than that of the signal processing output OUT.

Next, a more specific embodiment 32C of the A/D converter 32B will be described with reference to FIG. 5. The illustrated A/D converter 32C is implemented by a 14-bit pipeline A/D converter which has the resolution higher than that of the signal processor. The 14-bit pipeline A/D converter makes use of the fact that an A/D converter is not required to have a 14-bit linearity when it is in full scale, i.e., when it has a full input signal. Stated another way, in the foregoing example, the A/D converter needs the 14-bit linearity only when the gain is at maximum, i.e., 64 times (corresponding to a shift to the left by six bits), and as the gain is reduced from the maximum value, the A/D converter may also have a lower linearity. Also, the maximum gain is typically used when an object of a CCD camera is excessively dark, in which case an output level from the CCD camera is also very small, and therefore an input signal to the A/D converter is correspondingly quite small. For this reason, the A/D converter is required to have a high linearity only for a very small signal near the minus full scale. Conversely, when an input signal to the A/D converter is sufficiently large so that a low gain is merely required, the A/D converter may have a lower linearity. As an A/D converter that meets such requirements, this embodiment employs a pipeline A/D converter which has the resolution unequal to the linearity.

Figure 5:
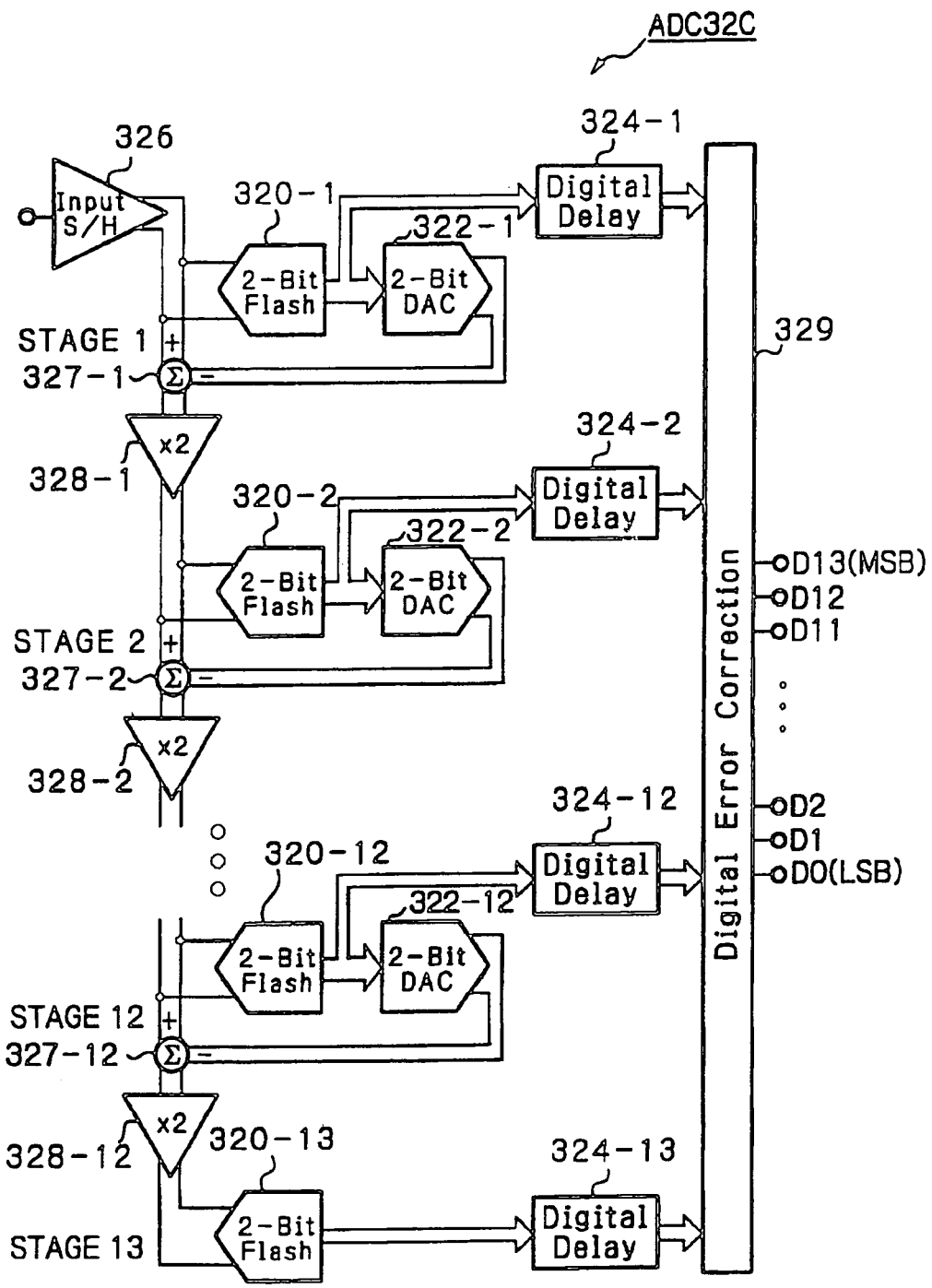
FIG. 5 is a block diagram illustrating an A/D converter according to another embodiment of the present invention, which can be used as the A/D converter of FIG. 3.
Figure 6:
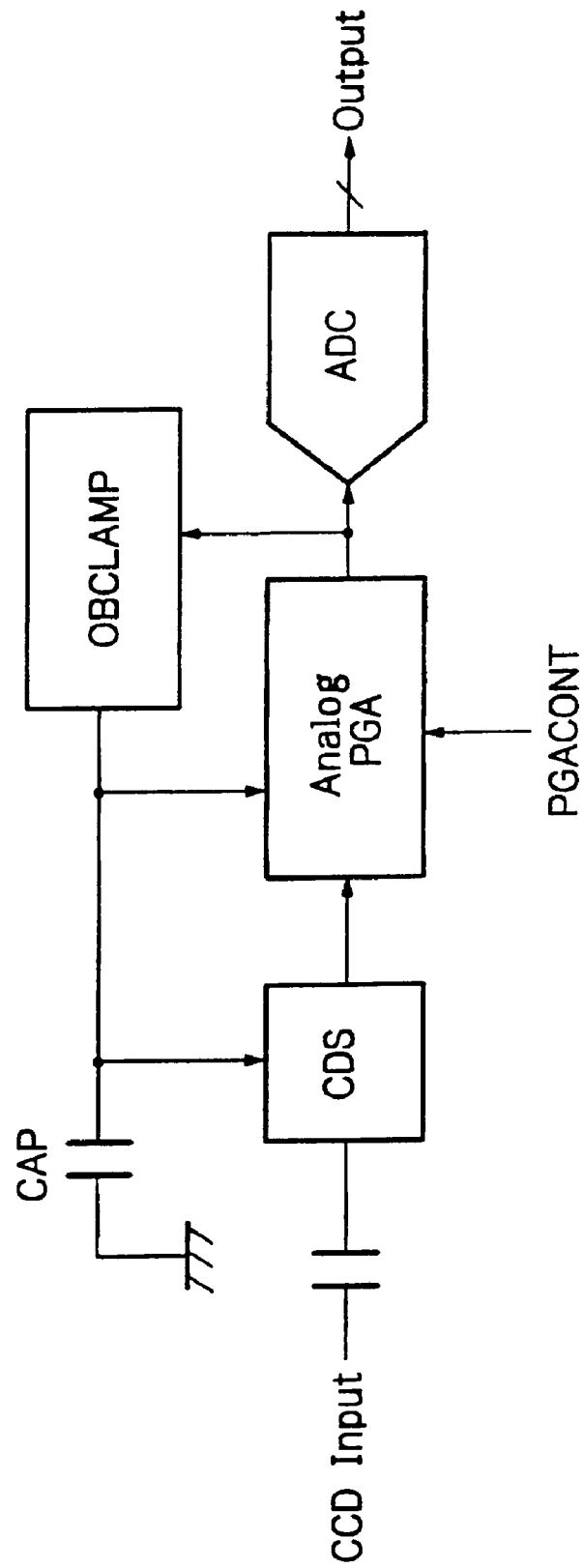
FIG. 6 is a block diagram illustrating a conventional front end signal processor for a CCD image sensor.

As illustrated in FIG. 5, the pipeline A/D converter 32C comprises 13 flash A/D converter elements 1–13 arranged in pipeline connected stages, wherein the flash A/D converter element in each of the stages has a low resolution of one bit to two bits (two bits in the illustrated example). Each stage includes a 2-bit flash A/D converter element 320-1–13; a 2-bit D/A converter 322-1–12 (not provided in the last stage) having an input connected to the output of the 2-bit flash A/D converter element; and a digital delay 324-1–13 having an input connected to the output of the flash A/D converter element 320-1–13. The first stage includes a sample and hold circuit 326 which receives an input signal to the A/D converter 32C and has an output connected to the input to the flash A/D converter element 320-1. It should be noted, that the function of the sample and hold circuit is not required because it is actually performed by the correlated double sampler. Between the respective stages, adders 327-1–12 and double amplifiers 328-1–12 are arranged. Each adder 327 subtracts the output of the D/A converter at the previous stage from the output of the sample and hold circuit 326 or the output of the double amplifier 328 at the previous stage. The output of the digital delay 324-1–13 at each stage is supplied to a digital error correcting circuit 329 which corrects possible errors in the output of the digital delay, and then generates an A/D converted output at 14-bit output terminals D0–D13.

Next, the operation of the A/D converter 32C will be described. First, an input analog signal is digitized by the low resolution (2-bit) flash A/D converter element 320-1 at Stage 1 which outputs a 2-bit code. The 2-bit code is again converted to an analog value by the 2-bit D/A converter 322-1, and the adder 327-1 subtracts the converted analog value from the input signal. The resulting residue signal is amplified by the double gain amplifier 328-1 and then passed to the next stage. Subsequently, the foregoing operation is repeated as the respective resulting signal is passed to the next stage until Stage 13 is reached. In this way, a total of 26 bits, i.e., 2 bits from each stage, of digital output data are provided, and passed through a digital error correcting circuit to drop redundancy bits to eventually output only 14 bits. When Stage 1 is sampling a signal of a certain pixel, Stage 2 is holding a signal of the previous pixel, while Stage 3 is sampling the held signal. In this way, the operations of the respective stages advance concurrently, so that significantly high throughput can be accomplished. The digital outputs at Stages 1–13 are respectively delayed as appropriate until they keep pace with the digital output at Stage 13. Eventually, 14 bits are simultaneously output. The timing of the simultaneous output is delayed by approximately seven clocks from the time Stage 1 has sampled the input signal (pipeline delay).

The pipeline A/D converter 32C configured as described above has such characteristics that exhibit a largely reduced accuracy near a threshold level of the flash A/D converter element 320-1 at Stage 1, but improves the linearity as an input signal to the A/D converter is smaller. Therefore, this effect becomes more prominent as each A/D converter has a lower resolution. For example, assuming that the flash A/D converter element has a resolution of one bit, since the threshold level is positioned halfway of the full scale input (FS), the accuracy becomes higher by approximately one bit than a full scale input when an input signal to the A/D converter is lower than the threshold level. Subsequently, the accuracy is increased by one more bit if an input signal is smaller than FS/4, and again by one more bit if smaller than FS/8, and so forth. Thus, the characteristic of the pipeline A/D converter is such that the linearity is gradually improved as the input signal is smaller.

While a larger increase in the resolution of the pipeline A/D converter results in a larger number of stages and a larger pipeline delay, the pipeline delay will not cause grave problems in most applications. The use of such pipeline A/D converters is generally encountered for implementing an A/D converter having ten bits or more at a video rate. The present invention employs, among others, a pipeline A/D converter comprised of flash A/D converter elements at the respective stages having the resolution of as low as one bit or two bits, such that the linearity is remarkably improved as the input signal level is lower. In this way, the objects of the present invention are achieved even without requiring the accuracy of 14 bits to the A/D converter in full scale, thereby making it possible to minimize an increase in power consumption resulting from the employment of an A/D converter having a higher resolution.

The A/D converter 32C according to this embodiment of the present invention, when used, exhibits a sufficient compatibility with the 10-bit linearity of the signal processor even without having a linearity of as high as 14 bits for the full dynamic range of an input signal, as is the case of the A/D converter 32B illustrated in FIG. 3. As a significant feature, the A/D converter 32C only requires A/D converter elements which exhibit a high linearity only near the minus full scale for its implementation. It is therefore possible to implement the A/D converter with those of low power consumption type.

While several embodiments of the present invention have been described above, the following modifications may be made to these embodiments. First, the black level code generator 36B in FIG. 3 may be provided with a dedicated register for externally changing the black level code such that the black level code can be externally set through an appropriate circuit such as serial communications. The same applies to the pedestal code generator 54B which may be provided with a dedicated register to permit the pedestal code to be externally changed through a circuit such as a serial communications circuit. Second, the gain code generator 52B in FIG. 3 may set a generated gain code based on the output of the subtractor 34B, or the output of the signal processor which is the output of the adder 502B, or a signal which may be provided from another location. Also, the gain code generator 52B may be modified to generate the gain code GAIN for realizing any arbitrary characteristics other than the logarithmic amplification as required. Third, while in the embodiment illustrated in FIG. 3, the output of the buffer 76B is fed back to the reference voltage terminal of the correlated double sampler 30B, the output of the buffer 76B may be fed back to the reference voltage terminal of the A/D converter 32B.

Since the front end signal processing method and apparatus according to the present invention as described above in detail rely on the digital processing for performing the logarithmic operation, a complicated analog logarithmic amplifier can be eliminated, thereby resulting in a significant reduction in power consumption. Also, a digital signal before gain multiplication is used to clamp the black level, the gain is changed outside the feedback loop, thereby making it possible to avoid fluctuations in time constant due to a changed gain. This results in further elimination of a complicated analog processing circuit for compensating for such fluctuated time constant, thus further reducing the power consumption. Moreover, since the logarithmic operation is implemented by digital processing, the linearity of the gain curve can be improved as compared with the prior art. Consequently, the foregoing effects are combined to improve the manufacturing yield and reduce the cost of the front end signal processor.

What is claimed is:

1. A front end signal processing method for processing a signal from an image sensor comprising the steps of:

detecting luminance information included in a sensor output signal by receiving said image sensor output signal at a signal input of a correlated double sampler having a reference voltage terminal, detecting the luminance information included in said sensor output signal by means of said correlated double sampler, to generate an analog luminance signal representative of the detected luminance information;

converting said analog luminance signal to a digital form to generate a digital luminance signal representative of the detected luminance information;

clamping a black level of said luminance signal to a constant value based on said digital luminance signal by supplying a feedback signal produced from said digital luminance signal to said reference voltage terminal of said correlated double sampler; and digitally multiplying said digital luminance signal by a predetermined gain code to generate a front end processed signal output, wherein said step of digitally multiplying includes the steps of generating the predetermined gain code;

digitally multiplying said digital luminance signal by said gain code to generate an amplified digital luminance signal;

generating a pedestal code representative of a pedestal level; and adding said pedestal code to said amplified digital luminance signal to offset the multiplied digital luminance signal toward the positive side to generate the addition result as said front end processed signal output.

2. A front end signal processing method according to claim 1, wherein said step of detecting luminance information to generate a digital luminance signal generates said digitized output with a higher resolution than said front end processed signal output.

3. A front end signal processing method according to claim 1, wherein said step of detecting luminance information to generate a digital luminance signal further includes the steps of:
  generating a reference black level value for said image sensor; and
  subtracting said reference black level value from said digitized output to generate the subtraction result as said digital luminance signal.

4. A front end signal processing method according to claim 3, wherein said reference black level value is variable.

5. A front end signal processing method according to claim 1, wherein said step of digitally multiplying includes using a digital programmable gain amplifier.

6. A front end signal processing method according to claim 1, wherein said pedestal code is variable.

7. The method of claim 1 wherein said step of digitally multiplying said digital luminance signal by a predetermined gain code imposes a logarithmic characteristic on said front end processed signal output.

8. A front end signal processing apparatus for processing a signal from an image sensor comprising:
  a luminance detecting/digitizing circuit coupled to receive a sensor output signal from said image sensor for detecting luminance information included in said sensor output signal to generate a digital luminance signal representative of the luminance information, wherein said luminance detecting/digitizing circuit includes
    a correlated double sampler coupled to receive said image sensor output signal for detecting luminance information included in said sensor output signal to generate an analog luminance signal representative of the detected luminance information, and
    an A/D converter coupled to receive said analog luminance signal to convert said analog luminance signal to a digital form to generate a digitized output;
  a digital processing circuit coupled to receive said digital luminance signal for multiplying said digital luminance signal by a predetermined gain code to generate the multiplication result as a front end processed signal output; and
  a clamping circuit coupled to receive said digital luminance signal for supplying a feedback signal produced from said digital luminance signal to said luminance detecting/digitizing circuit to clamp a black level of said luminance signal to a constant value, wherein said clamping circuit supplies said feedback signal to a reference voltage terminal of said correlated double sampler, wherein said digital processing circuit includes
  a gain code generating circuit for generating the predetermined gain code,
  a multiplying circuit for digitally multiplying said digital luminance signal by said gain code to generate an amplified digital luminance signal,
  a pedestal code generating circuit for generating a pedestal code representative of a pedestal level to offset the multiplied digital luminance signal toward the positive side, and
  an adder for adding said pedestal code to said amplified digital luminance signal to generate the addition result as said front end processed signal output.

9. A front end signal processing apparatus according to claim 8, wherein said A/D converter generates said digitized output with a higher resolution than said front end processed signal output.

10. A front end signal processing apparatus according to claim 9, wherein said A/D converter is a pipeline A/D converter.

11. A front end signal processing apparatus according to claim 8, wherein said A/D converter is configured such that a linearity of said A/D converter is increased as an input to said A/D converter is reduced.

12. A front end signal processing apparatus according to claim 8, wherein said luminance detecting/digitizing circuit further includes:
  a reference black level value generating circuit for generating a reference black level value for said image sensor; and
  a subtractor connected to an output of said A/D converter and to said black level value generating circuit, said subtractor subtracting said reference black level value from said digitized output to generate the subtraction result as said digital luminance signal of said luminance detecting/digitizing circuit.

13. A front end signal processing apparatus according to claim 12, wherein said reference black level value generating circuit generates a variable reference black level value.

14. A front end signal processing apparatus according to claim 8, wherein said digital processing circuit includes a digital programmable gain amplifier.

15. A front end signal processing apparatus according to claim 8, wherein said pedestal code generating circuit generates a variable pedestal code.

16. The front end signal processing apparatus according to claim 8 wherein said predetermined gain code causes the multiplying by said digital processing circuit to impose a logarithmic characteristic on said front end processed signal output.

* * * * *